United States Patent [19]
Ashe

[11] Patent Number: 5,995,103
[45] Date of Patent: *Nov. 30, 1999

[54] WINDOW GROUPING MECHANISM FOR CREATING, MANIPULATING AND DISPLAYING WINDOWS AND WINDOW GROUPS ON A DISPLAY SCREEN OF A COMPUTER SYSTEM

[75] Inventor: Dylan B. Ashe, Sunnyvale, Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/644,720

[22] Filed: May 10, 1996

[51] Int. Cl.$^6$ .............................. G06F 9/00; G06F 3/14
[52] U.S. Cl. ..................... 345/346; 345/340; 345/356
[58] Field of Search .................... 395/332, 340, 395/343, 335; 345/332, 334, 340, 343, 346, 335, 356

[56] References Cited

U.S. PATENT DOCUMENTS

| | | | |
|---|---|---|---|
| 4,555,775 | 11/1985 | Pike ........................................ | 345/344 |
| 4,574,364 | 3/1986 | Tabata et al. ........................... | 345/343 |
| 4,890,257 | 12/1989 | Anthias et al. ......................... | 344/344 |
| 5,121,478 | 6/1992 | Rao ........................................ | 345/346 |
| 5,390,295 | 2/1995 | Bates et al. ............................. | 345/342 |
| 5,412,776 | 5/1995 | Bloomfield et al. .................... | 345/346 |
| 5,491,795 | 2/1996 | Beaudet et al. ......................... | 345/346 |
| 5,499,334 | 3/1996 | Staab ...................................... | 345/340 |
| 5,544,300 | 8/1996 | Skarbo et al. ........................... | 345/332 |
| 5,546,528 | 8/1996 | Johnston ................................ | 345/344 |
| 5,572,649 | 11/1996 | Elliott et al. ............................ | 345/340 |
| 5,577,187 | 11/1996 | Mariani .................................. | 345/342 |
| 5,590,264 | 12/1996 | Kean et al. ............................. | 395/340 |
| 5,590,266 | 12/1996 | Carson et al. .......................... | 395/340 |
| 5,600,346 | 2/1997 | Kamata et al. ......................... | 345/340 |
| 5,613,057 | 3/1997 | Caravel .................................. | 395/340 |
| 5,694,561 | 12/1997 | Malamud et al. ...................... | 345/346 |

OTHER PUBLICATIONS

Rose, Caroline et al., "The Window Manager", Apple Computer, Inc., 1985, pp. I–269–I–308.
Windows 3.1: "A Developers Guide", Jeffrey M. Richter, 1992, 2nd Edition, pp. 32–35.
Programmer's Guide to the EGA, VGA, and Super VGA Cards, "Principles of Computer Graphics", Richard F. Ferraro, 1994, 3rd Edition, pp. 115–118.
Computer Dictionary—Second Edition, Microsoft Press, Redmond, Washington, 1994.
Foley, James D. et al., "Computer Graphics—Principles and Practice", Addison–Wesley Publishing Co., 1990, Chapter 10, User Interface Software, pp. 435–450.
Newton, Harry, "Newton's Telecom Dictionary", 1993.

*Primary Examiner*—Raymond J. Bayerl
*Assistant Examiner*—Cao H. Nguyen
*Attorney, Agent, or Firm*—Cesari and McKenna, LLP

[57] ABSTRACT

A window grouping mechanism for creating, organizing and manipulating windows and, more specifically, window groups for display to a user of a computer system is disclosed. The window grouping mechanism preferably includes a series of linked data structures configured to organize information pertaining to all windows defined by an application program executing on the computer system. According to an aspect of the invention, the application program interacts with the window grouping mechanism to further organize the information into any number of window groups each of which contains a different subset of the previously defined windows. These window groups may then be manipulated by the application program to efficiently create various permutations of window groups.

28 Claims, 8 Drawing Sheets

WINDOW GROUPING MECHANISM FOR
CREATING, MANIPULATING AND
DISPLAYING WINDOWS AND WINDOW
GROUPS ON A DISPLAY SCREEN OF A
COMPUTER SYSTEM

FIELD OF THE INVENTION

The present invention relates generally to the organization, manipulation and display of windows on a display screen of a computer system. More specifically, the present invention relates to a method and apparatus for creating, manipulating and displaying windows associated with an application program by groups.

BACKGROUND OF THE INVENTION

A computer system typically includes a monitor having a display screen for presenting information, such as text and images, to the user. The display screen can be configured into a window environment in which separate areas of the display screen, called windows, are used to present information to the user, to display information entered by the user or to interact with the user. Each window, which is typically rectangular in shape, can present or represent different information or different views of the same information. The window may include decorations such as a title bar, zoom button, etc. Examples of popular software systems that employ window environments are the System 7® operating system developed by Apple Computer, Inc. and the Microsoft Windows 95® operating system, which is commercially available from Microsoft Corporation.

Typically, a window manager controls the size and position of each window on the display screen. The window manager is a set of system software routines, located within the computer's operating system, that is responsible for managing the windows that the user views during operation of the computer system. The window manager keeps track of the location and size of each window and the window areas that must be drawn and redrawn in response to commands issued by application programs executing on the computer system. These commands, which may include move windows, change window sizes, etc., are generated and sent by the application program to the window manager via application programming interfaces (APIs). APIs typically include a collection of system calls requesting services from the operating system.

Each application program executing on the computer system defines a set of windows that are associated with that application. For example, a drawing application may define a document window into which a user "draws" images as well as floating or palette windows which contain tools, such as pencil, color, etc., for drawing those images. Similarly, a word processing application may have a document window into which text is entered as well as palette windows containing the tools, such as cut, paste, paragraph numbering, etc., available to manipulate the text. The application program may also define modal windows such as dialog boxes or alert boxes that appear in front of both the document windows and the palette windows, requesting immediate attention and input from the user.

The window manager typically stores these windows in layers defined by and associated with these application programs. A window layer is simply a set of all the windows associated with a single application program. The window manager maintains these window layers in a block of memory.

In addition to controlling the size and position of each window on the display screen, the window manager also controls the front-to-back order of the windows displayed on the display screen. This front-to-back positioning is referred to as the window's "z-order", which is named for the z-axis of a three-dimensional coordinate system, where z is the coordinate extending into the computer screen. In particular, a number is assigned to each layer of windows describing its priority class relative to the other window layers. A window layer's priority class defines where in the z-order the window layer can be displayed. For example, a window layer of priority class "2", e.g. a screen saver, will always appear in front of a window layer of priority class "3", e.g. an application program, while multiple window layers of priority class "3", e.g. a word processing application and a spreadsheet application, can overlie each other in the z-order. The window manager also controls the ordering in which document, floating and modal windows may appear within a specific application layer.

In prior art systems, the window manager draws the entire layer of windows associated with a currently executing application program at the front of the computer screen for display to a user of the computer system. For example, if the user initiates a word processing operation, then the layer of windows associated with a word processing application is brought to the front of the screen. Behind that layer of word processing windows is a layer of windows associated with the last executed application program, such as a drawing application, which is assigned to the same priority class as the word processing layer of windows. Behind the layer of drawing windows is a third layer of windows from the application program used before the drawing application, such as a spreadsheet application.

When a user selects a window that is not displayed on the front of the screen, the window manager brings that window and all of the windows in that layer to the front of the screen, provided that the priority class of the selected window layer is the same as or higher than the priority class of the window layer currently being displayed. If, during a word processing task, for example, the user selects a window from the spreadsheet application, the prior art window manager re-draws the screen so that all of the windows from the spreadsheet application are at the front of the screen. This re-drawing of the windows displayed on the screen also alters the z-ordering of windows by placing the spreadsheet layer of windows ahead of the word processing layer of windows.

Such re-positioning of window layers by application program, however, may result in a cluttered window environment where the user is only interested in a single document window and a limited group of palette windows associated with that particular document window. This often occurs when a user has the window environment configured to display windows from two or more applications simultaneously, such as a word processing application and a spreadsheet application. With the multiplicity of palette windows available with most applications, such a window environment can quickly become incoherent. Moreover, upon selection of the document window, the conventional window managers display all of the windows in the layer associated with that application program. The prior art window managers do not support the creation or display of window groups containing something less than all of the windows in the layer associated with the application program.

In U.S. patent application Ser. No. 08/540,010, filed Oct. 6, 1995, entitled Method and Apparatus for Arranging and Displaying Windows on a Display Screen of a Computer System and assigned to the assignee of this application, a system is disclosed for creating and displaying groups of windows associated with an application program. Although the system disclosed in that application is a substantial improvement over the prior art window managers, it has limitations. For example, the system does not permit entire window groups to be added to other window groups and further, does not permit an application program to access the list of windows defined by that application or the windows or window groups contained within a particular window group. These limitations obviate iteration, i.e., scanning or reviewing of the windows defined by the application. Moreover, the system is not easily implemented in an object oriented programming environment.

SUMMARY OF THE INVENTION

It is an object of the present invention to provide a highly flexible mechanism for efficiently organizing information concerning each window defined by a particular application program.

It is a further object of the present invention to permit application programs to organize that information concerning the predefined windows.

It is a further object of the present invention to permit application programs to organize the information in order to perform other operations and functions, such as reordering the windows defined by the application program.

It is a further object of the present invention to provide a window grouping mechanism that can be easily implemented in an object oriented programming language.

Briefly, the invention comprises a novel window grouping mechanism for creating, organizing and manipulating windows and, more specifically, window groups for display to a user of a computer system. The window grouping mechanism comprises a series of linked data structures configured to organize information pertaining to all windows defined by an application program executing on the computer system. According to an aspect of the invention, the application program interacts with the window grouping mechanism to further organize the information into any number of window groups each of which contains a different subset of the previously defined windows. These window groups may then be manipulated by the application program to efficiently create various permutations of window groups, as described herein.

Specifically, the window grouping mechanism includes a first linked data structure containing a sequence of data elements each corresponding to a window created by the application program. These data elements include information concerning membership of the window in window groups, whether any window groups are attached to the window and information necessary to draw that window on a display screen of the computer system or instructions as to where that information may be located.

The window grouping mechanism also organizes these windows by class (e.g., modal, floating and document window classes). That is, each class of window preferably occupies a contiguous portion of the first linked data structure and each class is distinguished by a transition within that structure. This organizational feature of the invention allows the window grouping mechanism to present a coherent window environment to the user of the computer system when re-drawing the display screen in response to instructions from the application program to display a selected window group. The ability to organize windows into groups is especially useful when a user has more than one application program running at the same time, by allowing those applications to customize the particular windows being displayed to the user.

In the illustrative embodiment, a second linked data structure similar to the first structure also contains a sequence of data elements, although these elements each represent a window group created at the direction of the application program. In particular, each element of the second linked data structure contains inter alia information concerning the number of windows contained within the window group, the number of window groups within the group, a list of the windows in the group and a list of the groups encompassed within the group.

One of the permutations that may be efficiently performed on these data structures includes the ability to encompass window groups within each other. More specifically, a target group may be encompassed within a base group by simply adding the target group to the list of groups within the base group. In addition, a group may be attached to a particular window by listing the group in the data element corresponding to the particular window. For this latter permutation, selection of the window results in the window grouping mechanism re-drawing the display screen to display the window and the attached group. The window grouping mechanism further permits an application to select for re-drawing only those windows within a group that belong to a particular class of windows (e.g., all floating windows).

Moreover, in response to other instructions from the application program, the window grouping mechanism copies entries in the linked data structures to an area of buffer memory also accessible by the application program. The application program can then access this buffer memory to iterate, i.e., scan or view, the order of windows in the first linked data structure or the contents of a group from the second linked data structure. The application can also alter or re-order the sequence of information in these linked data structures. Other permutations, as described herein, are also possible by virtue of the novel window grouping mechanism summarized above.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENT

Figure 1:
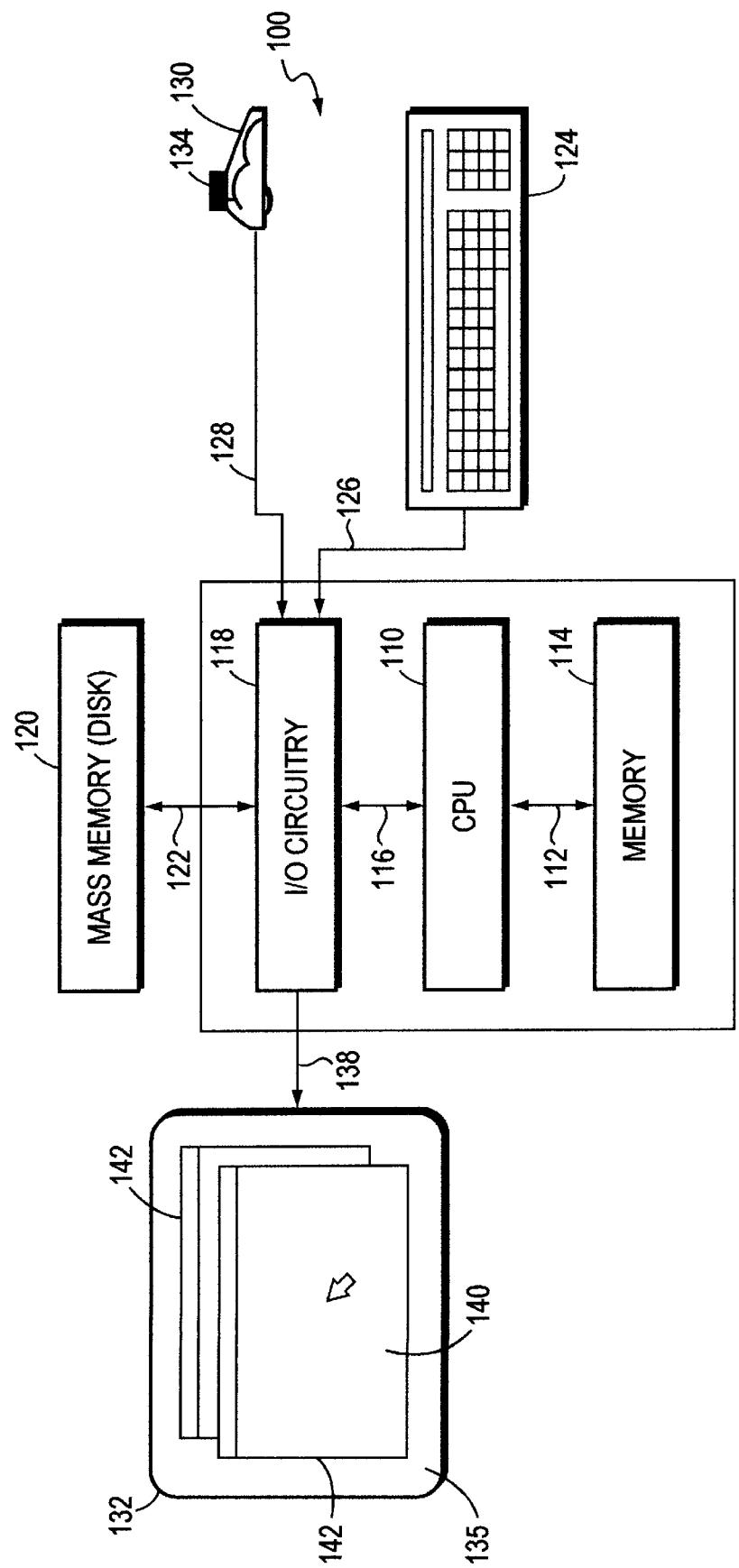
FIG. 1 is a block diagram of a computer system, such as a personal computer system, on which the invention may advantageously operate.

FIG. 1 illustrates a computer system 100 comprising a central processing unit (CPU) 110 coupled between a memory 114 and an input/output (I/O) circuitry 118 by bi-directional buses 112 and 116, respectively. The memory 114 typically comprises random access memory (RAM) for the temporary storage of information, including an application program and an operating system (FIG. 2), and read only memory (ROM) for permanent storage of the computer's configuration and basic operating commands. As further described herein, the application program and the operating system interact to control the operations of the CPU 110 and the computer system 100.

The I/O circuitry 118 is, in turn, connected to a mass storage unit 120 such as a disk drive, via bi-directional bus 122. Cursor/pointer control devices, such as a keyboard 124 and a mouse 130, connect to the I/O circuitry 118 via cables 126 and 128, respectively. The mouse 130 typically contains at least one button switch 134 operated by a user of the computer system 100.

A conventional display monitor 132 having a display screen 135 is also connected to the I/O circuitry 118 via cable 138. A pointer or cursor 140 is displayed on the screen 135 and its position is controllable via the mouse 130 or the keyboard 124, as is well-known in the art. As described further herein, a window environment is displayed on the display screen 135 of the monitor 132. The window environment includes a plurality of windows 142.

In particular, the I/O circuitry 118 receives information, such as control and data signals, from the mouse 130 and the keyboard 124, and provides that information to the CPU 110 for storage on the mass storage unit 120 or for display on the screen 135. It is also to be understood that the I/O circuitry 118 contains the necessary hardware, e.g., buffers and adapters, needed to interface with the mouse 130, the keyboard 124 and the display monitor 132.

The computer system 100 is preferably a personal computer sold by Apple Computer, Inc., although the invention may also be practiced in the context of other types of computers, including the computers sold by International Business Machines Corp. These computers have resident thereon, and are controlled and coordinated by, operating system software, such as the System 7® operating system and the Microsoft Windows 95®. operating system. These operating systems include a window environment, such as a graphical user interface, that is preferably displayed on the screen as a graphical display to facilitate interactions between a user and the computer. The graphical display is typically arranged to resemble a desktop and each application program executes in an application window of the screen.

The window environment is generally part of the operating system software that includes a collection of utility programs for controlling the operation of the computer system. The operating system, in turn, interacts with the application program to provide higher level functionality, including a direct interface with the user. Specifically, the application program makes use of operating system functions by issuing a series of task commands to the operating system which then performs the requested task. For example, the application program may request that the operating system display certain information on the windows for presentation to the user.

The invention herein features, along with these windows, the provision of a new window grouping mechanism which, when invoked, causes actions to take place that enhance the ability of a user to interact with the computer system. This new behavior of the system is brought about by the interaction of the mechanism with a series of system software routines associated with the operating system. These system routines, in turn, interact with the application program to create the windows and manage their groupings, as described further herein.

Figure 2:
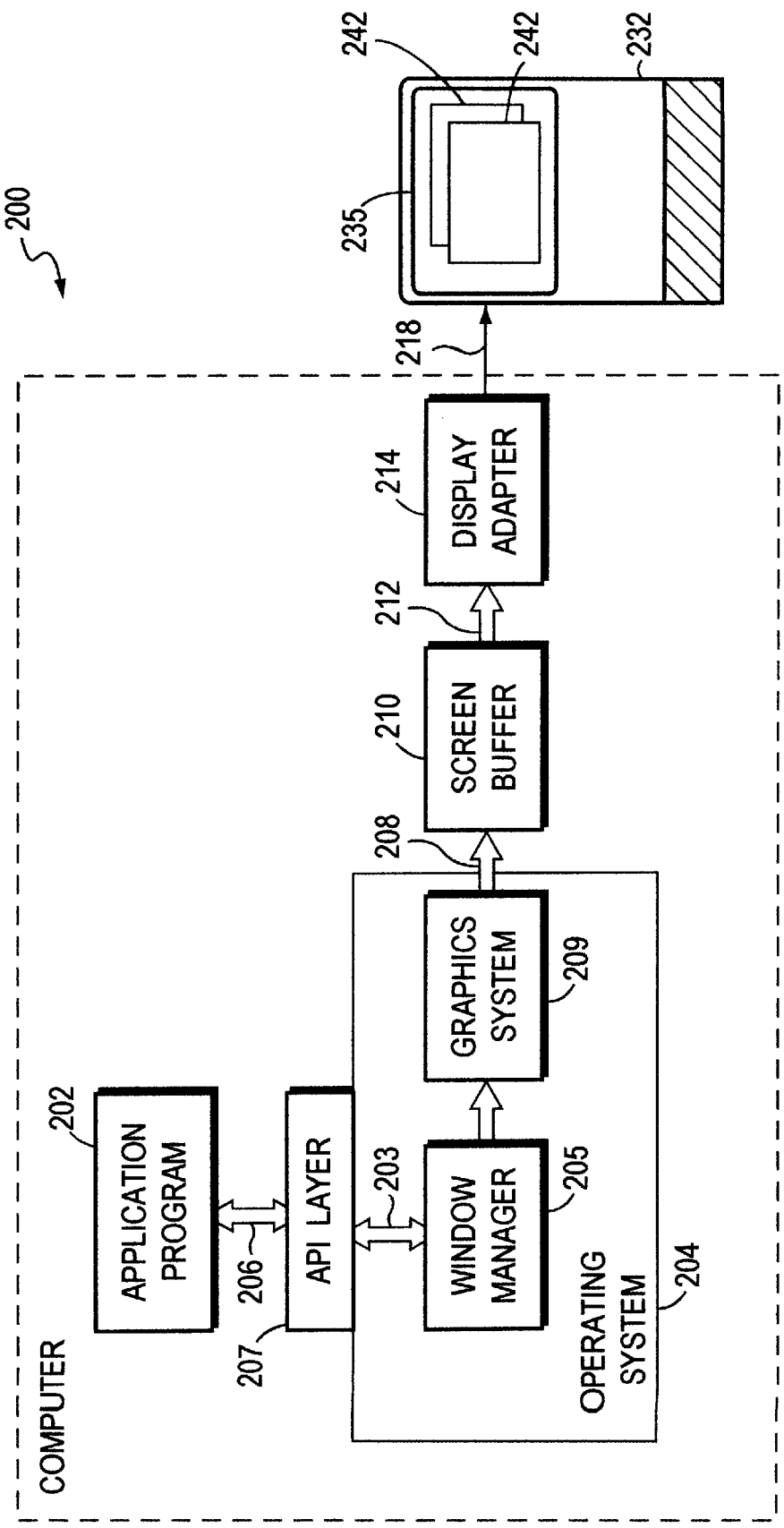
FIG. 2 is a block diagram showing the relationship of an operating system, an application program, a screen buffer and a display screen of the computer system of FIG. 2.

FIG. 2 is a highly schematized illustration of the interaction of an application program 202 and an operating system 204 of a computer system 200, which is similar to, and has equivalent elements of, the computer system 100 of FIG. 1. As noted, the application program 202 executes on the computer system 200. The application program 202 and the operating system 204 interact (via arrow 206), via task commands of an application programming interface (API) layer 207, to control the operations of the computer system 200.

The operating system contains system facilities, including a window manager 205 which, inter alia, directly implements those task commands. The lower-layer of the operating system 204 includes device drivers (not shown) for interfacing directly with the computer hardware (not shown). For each physical device, such as the mass storage unit 120 (FIG. 1), a device driver is provided to accept requests, to read or write data or to determine the status of the devices. Communication between the physical devices and CPU 110 (FIG. 1) may be effected either through polling of the device drivers or via interrupts.

Specifically, the window manager 205 is a set of software routines within the operating system 204 that is responsible for managing windows 242 displayed on a display screen 235 and viewed by the user during operation of the application program 202. The window manager 205 typically acts in direct response to task commands sent from the application program 202 to the operating system 204 via the API layer 207 as shown by arrow 203.

The window manager 205 may further use a graphics system 209 within the operating system to draw the display screen 235. The graphics system 206 stores the information to be displayed directly (via arrow 208) into a screen buffer 210. Under the control of various hardware and software in the computer system 200, the contents of the screen buffer 210 are read out of the buffer 210 and provided, as indicated schematically by arrow 212, to a display adapter 214. The display adapter 214 contains hardware and software (sometimes in the form of firmware) which converts the information in the screen buffer 210 to a form which can be used to drive the display screen 235 of monitor 232, which is connected to the display adapter 214 by an adapter cable 218.

In a preferred embodiment, the invention described herein is implemented in an object-oriented programming (OOP) language, such as C, using System Object Model (SOM) technology and OOP techniques. The C and SOM languages are well-known and many articles and texts are available which describe the languages in detail. In addition, C and SOM compilers are commercially available to developers and the public. Accordingly, for reasons of clarity, the details of the C and SOM languages and the operations of their compilers will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like computers, while also modeling abstract concepts like numbers or geometrical designs.

Objects are defined by creating "classes" which are not objects themselves, but which act as templates that instruct the compiler how to construct an actual object. A class may, for example, specify the number and type of data variables and the steps involved in the functions which manipulate the data. An object is actually created in a program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. More specifically, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 3:
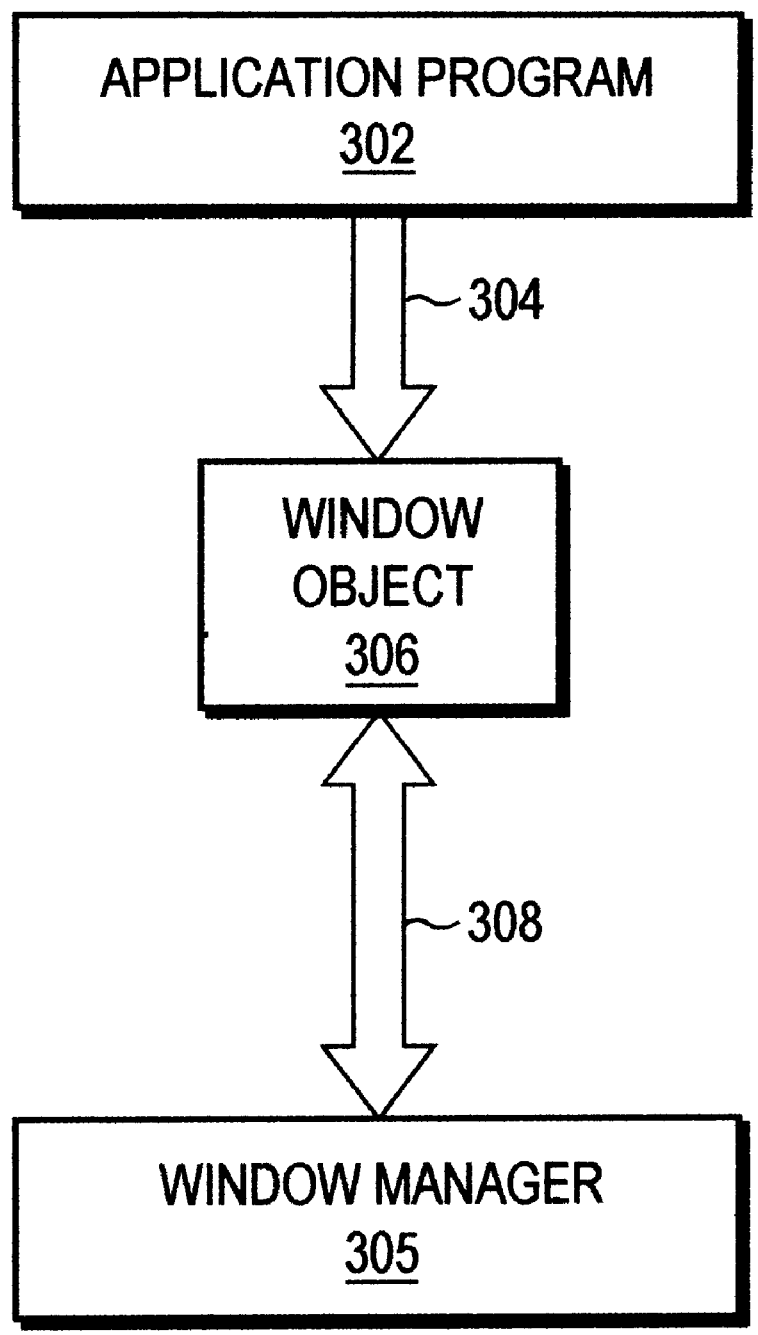
FIG. 3 is a highly schematic illustration of the interaction between an application program and a window manager to create a window object.

In accordance with the present invention, the windows are "objects" created by the application program to communicate with the window manager. Interaction between an application program and a window manager is illustrated in greater detail in FIG. 3.

In general, an application program 302 interfaces with the window manager 305 by creating and manipulating objects. The window manager 305 itself may be an object which is created when the operating system 204 (FIG. 2) is started. Specifically, the application program 302 creates window objects 306 that cause the window manager 305 to create associated windows 242 (FIG. 2) on the display screen 235. This is shown schematically by an arrow 304. The window object 306 communicates with the window manager 305 by means of a sequence of drawing commands issued from the window object 306 to the window manager 305, as illustrated by an arrow 308.

Figure 4:
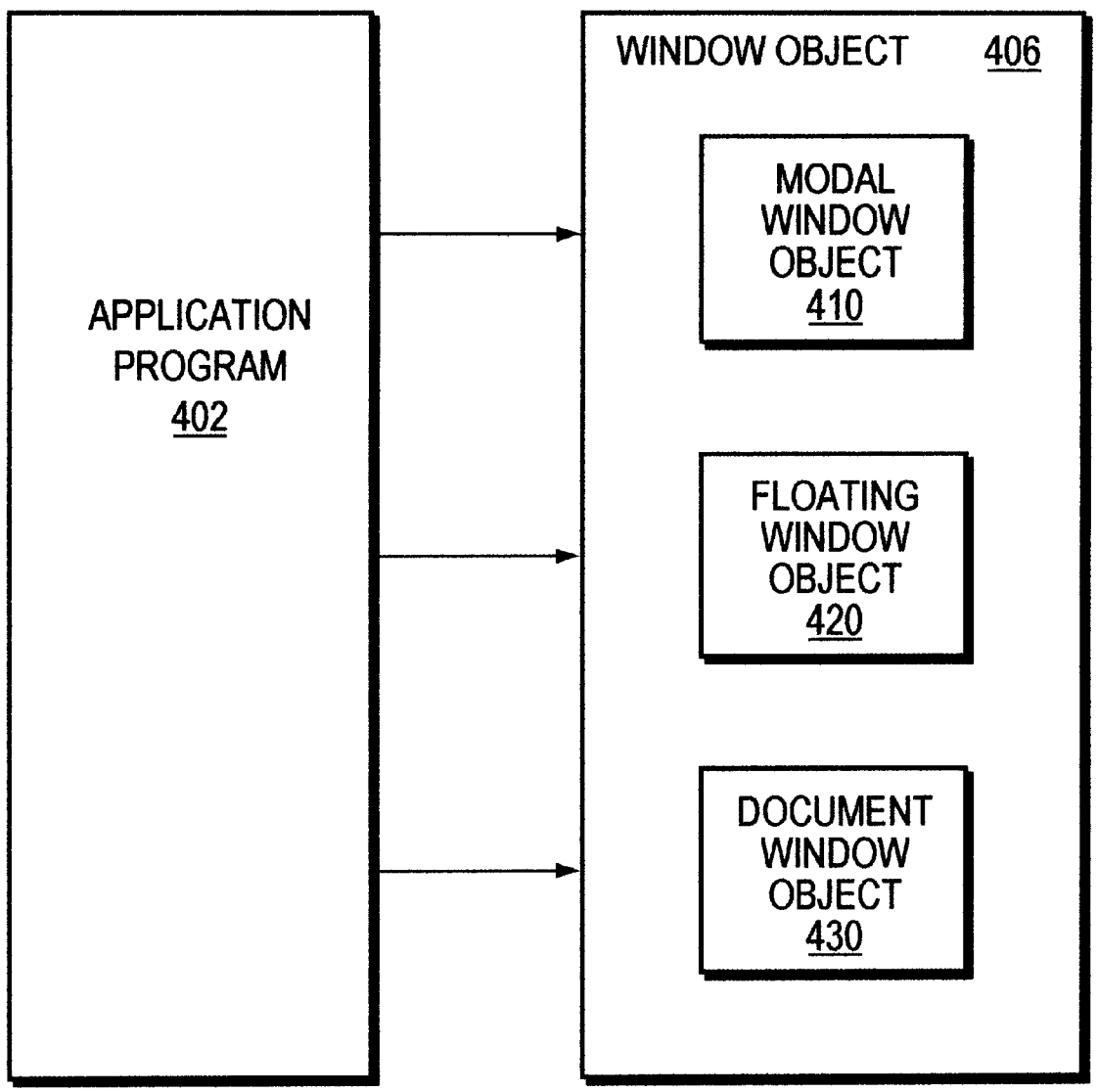
FIG. 4 is a schematic diagram of the window object of the present invention.

The window object 306 is an element of the novel window grouping mechanism that greatly enhances the ability of a user to organize many different windows displayed on the graphical user interface. FIG. 4 is a schematic diagram of a window object 406 comprising a modal window object 410, a floating window object 420 and a document window object 430. Each of these predefined objects are created by application program 402, and comprises data and functions that operate on that data.

The modal window object 410 implements a modal window that appears in front of all other kinds of windows in accordance with the novel grouping mechanism. The modal window is used for, e.g., modal dialog boxes and alert boxes, that require immediate attention from a user. The floating window object 420 is used to build a floating window appearing immediately behind modal windows; typically, this window is used as a tool palette, a catalog or as another element that acts on data provided through a document window. Document window object 430 implements the document window which is preferably used for data (such as graphics and/or text) and modeless dialog boxes. In the illustrative embodiment, the document window appears behind floating and modal windows according to the inventive mechanism described herein.

In order to further understand the operations of these window objects, it may be useful to examine their construction together with the major function routines that comprise the behavior of the objects. In examining the objects, it is also useful to examine the classes that are used to construct the objects (as previously mentioned the classes serve as templates for the construction of objects). Thus, the relation of the classes and the functions inherent in each class can be used to predict the behavior of an object once it is constructed.

Figure 5:
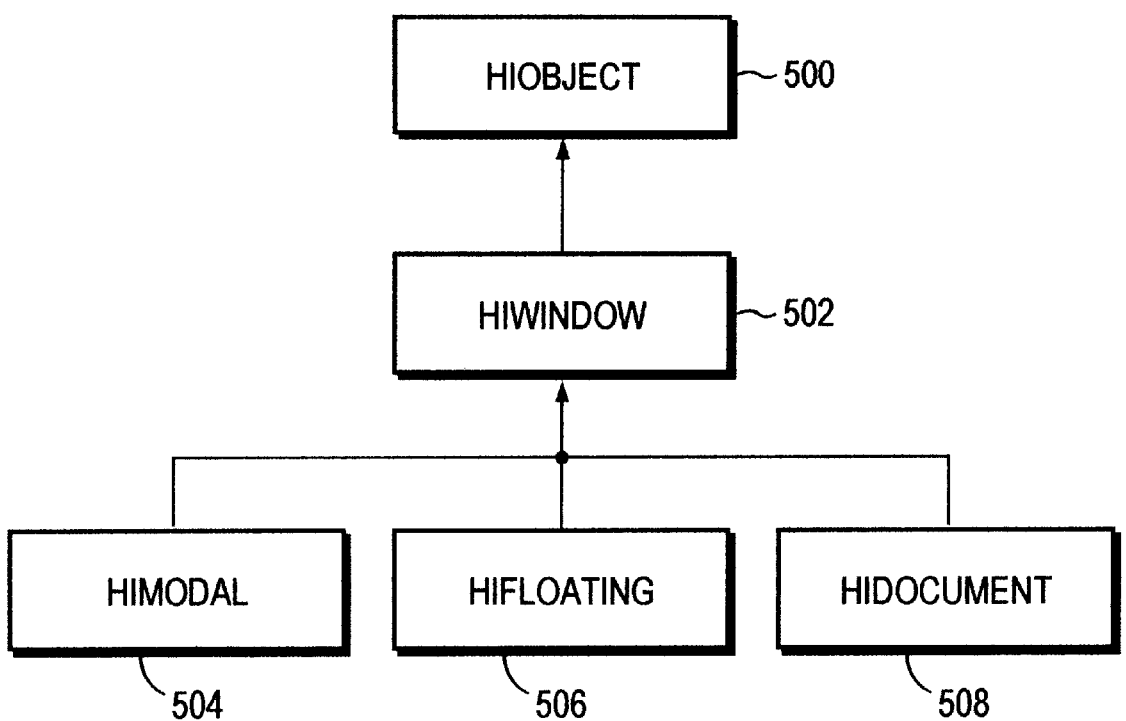
FIG. 5 is a simplified class hierarchy diagram for the window objects of the present invention.

FIG. 5 is a simplified class hierarchy diagram for the window objects of the invention. The class HIWindow 502, used to construct the (parent) window object, is a subclass of an abstract base class called HIObject 500. Notably, this class 500 is a base class for all window classes and provides all message-handling functions that a window class needs. Each of the classes used to construct the (child) window objects are subclasses of HiWindow and thus inherit any functional operators that are available from that class. For example, the subclass HIModal 504 is derived from HIWindow 502 and encapsulates the modal window. Similarly, the HIFloating class 506 and the HIDocument class 508 are used to construct floating windows and document windows, respectively. Hereinafter, we will refer to window objects 306 (FIG. 3) simply as windows.

Figure 6A:
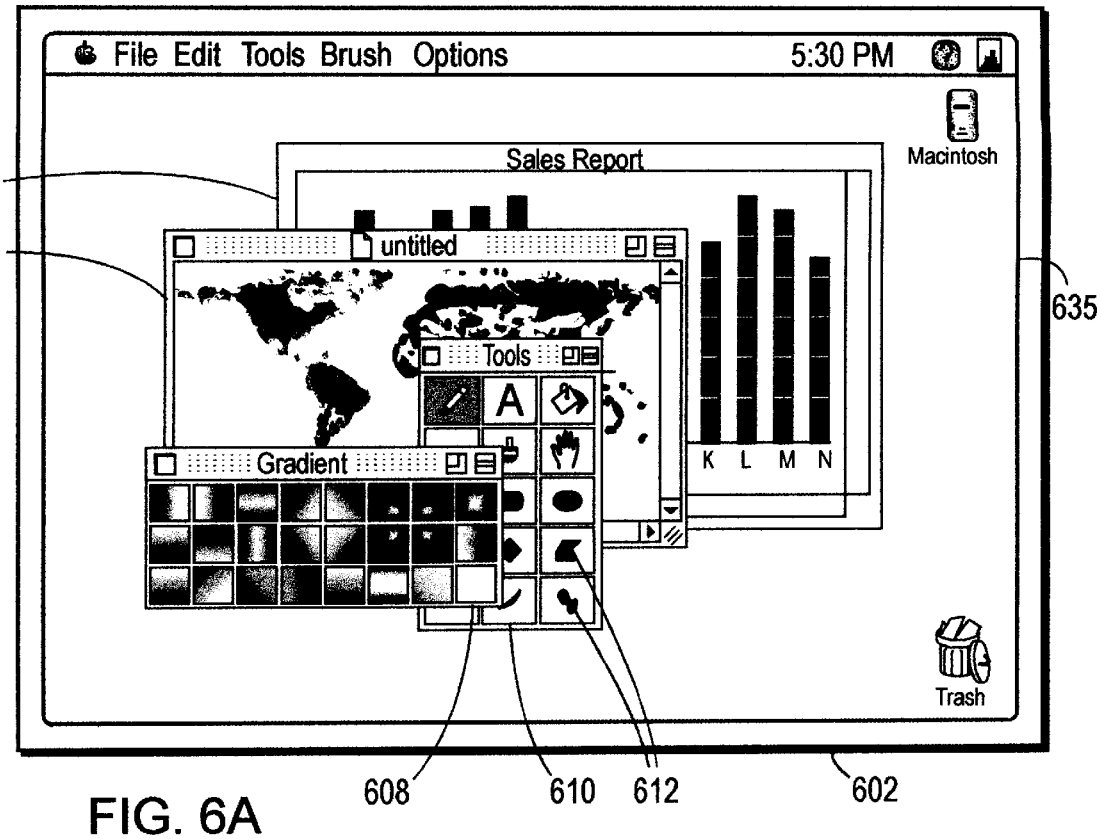
FIGS. 6A and 6B illustrate the Z-ordering in a typical window environment employing the present invention.
Figure 6B:
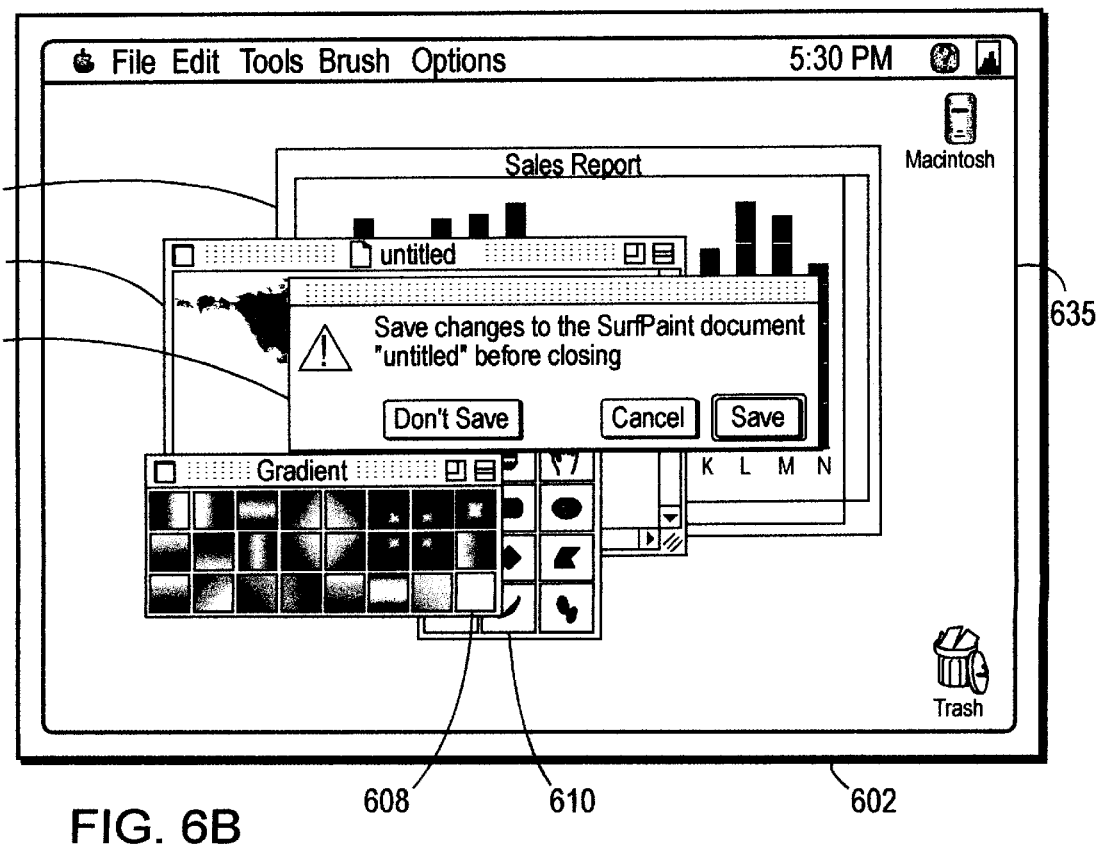

FIGS. 6A and 6B depict a typical window environment illustrating the various windows described above and, in particular, illustrating their Z-ordering on a display screen 635. Specifically, the window environment includes a first document window 604 which may be associated with a spreadsheet application and a second document window 606 which may be associated with a drawing application. Suspended in front of the second document window 606 are two floating windows 608 and 610 which portray tools 612 (FIG. 6A) that may be used on the second document window 606.

In addition to the document windows 604 and 606 and the floating windows 608 and 610, the window environment 600 also includes a modal window 614 (FIG. 6B), requesting input from the user. As noted, the modal window 614 appears in front of the floating windows 608 and 610 and the document windows 604 and 606.

Creation of the Master Application Window List

As further noted, each application program 302 (FIG. 3) executing on the computer system 200 (FIG. 2) typically creates the windows 306 associated with that application 302. Each window 306, moreover, is assigned a unique, identifying reference number by the application 302.

Figure 7:
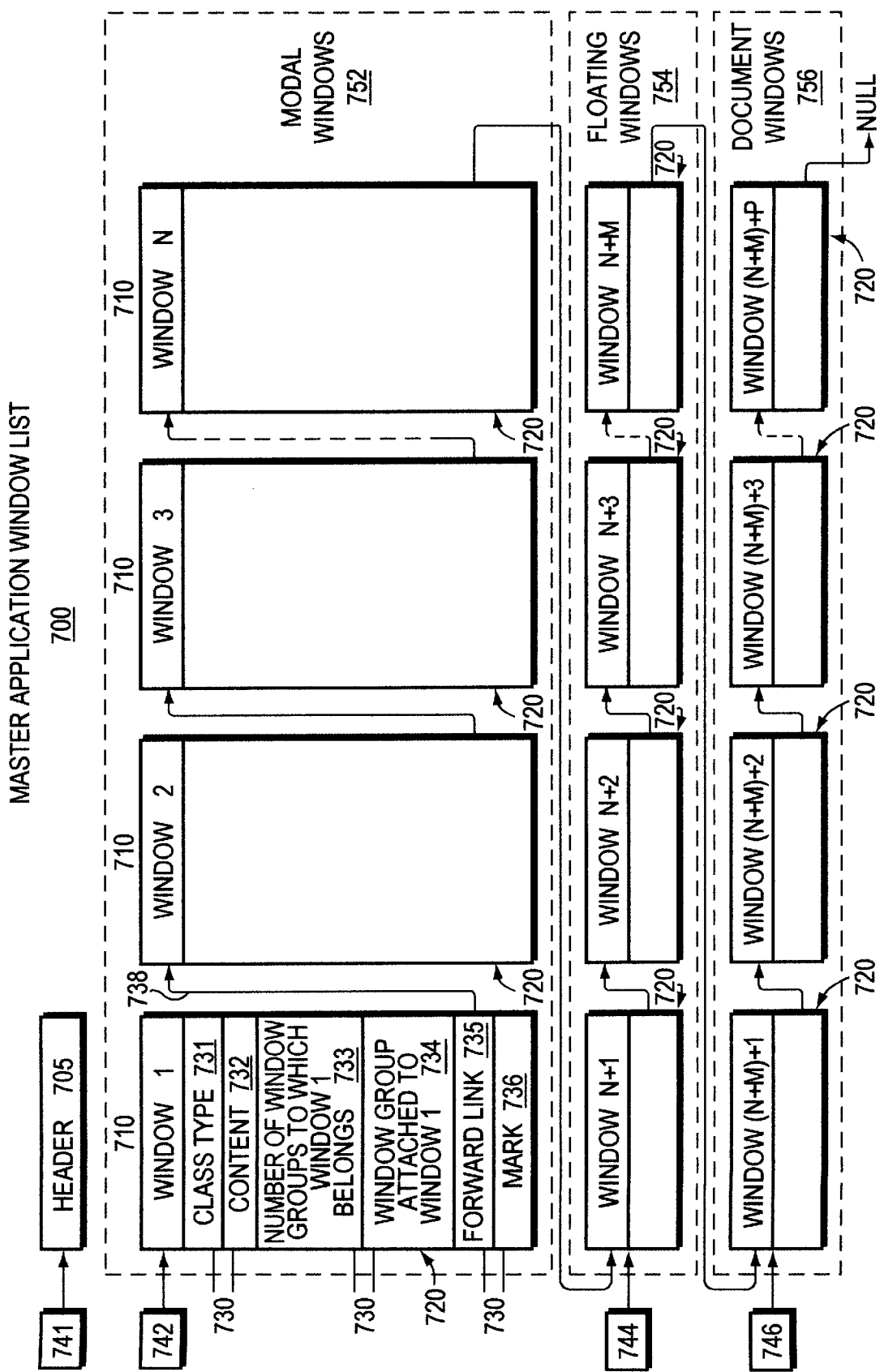
FIG. 7 is an illustration of the related data structures representing the windows defined by an application program.

As shown in FIG. 7, the window grouping mechanism comprises a Master Application Window List 700 which is essentially a master list of all of the windows 306 defined by that particular application 302. The Master Application Window List 700 is preferably stored in a portion of main memory 114 (FIG. 1) allocated by a memory management facility (not shown) in a conventional manner. The portion of allocated memory is initialized (i.e., all of the data fields within the portion of memory are set to a predetermined starting value, e.g., 000) and an address pointer 741 pointing to a header 705 located at the first allocated location in the memory is assigned by the memory manager.

In the preferred embodiment, the Master Application Window List 700 comprises a singly linked list of data elements 710 wherein each data element 710 corresponds to a window 306 (FIG. 3) created by the application program 302. Each data element 710, moreover, is preferably arranged as a table array 720 comprising a series of entries 730 containing fields for storing information related to that window 306. For example, the first entry 731 identifies the class of window being represented, e.g., document, floating or modal. The second entry 732 contains the information regarding the window's appearance as defined by the application program 302. It should be understood that the second entry 732, rather than containing the actual data supporting the window 306, may instead contain a pointer to another location in memory 114 (FIG. 1) where that information is stored.

The third entry 733 in the table array 720 contains a value indicating the number of window groups to which this window 306 belongs. The significance of this entry 733 is explained in more detail below. The fourth entry 734 signifies whether any window groups are attached to the window 306 and, if so, the identification and memory location of that window group, again, as explained below. The fifth entry 735 in each table array 720 is a forward link to the next element 710 in the list 700 as shown by arrow 738 and the last entry 736 contains a mark that may be either set or unset during window operations.

As each new window is created by the application program 302, information is entered in each entry 730 of the array 720 associated with that window 306. Moreover, the forward link 735 in the previous element 710 is set to the address of the new element 710 representing the new window. Notably, the forward link 735 of the last element 710 in the Master Application Window List 700 is preferably set to null, which is a predetermined value, e.g., 000, indicating that there are no more elements 710 in the list. Since each element 710 contains a forward link 735 to the next element 710 in the list, the entire list of windows in the Master Application Window List 700 can be scanned from front to back quickly and easily.

As the application program 302 (FIG. 3) creates a window 306, it can specify where in the list 700 that window element 710 is placed and thus in what order the window will be displayed relative to the other defined windows. For example, the application program 302 can place a window element 710 at the front of the list 700 by inserting it after the list header 705, thereby causing it to be displayed first. Similarly, the window element can be inserted at the end of the list by changing the forward link 735 in the last element 710 from null to the address of the inserted element 710 and setting the latter's forward link 735 to null. Alternatively, the window element 710 may be inserted in the middle of the list 700 by changing the forward link 735 of the element 710 just ahead of the inserted element 710 to point to the address of the inserted element 710 and setting the latter's forward link 735 to the next element 710 in the list 700.

The Master Application Window List 700 is also assigned a specific layer in the Z-order within which the windows associated with the application program 302 may be displayed relative to windows defined by other applications. Yet, it should be noted that windows defined by other application programs and assigned to other layers may appear in front of or behind the windows 306 represented in the Master Application Window List 700 depending on their priority.

Although the application program 302 is generally free to specify the ordering of the elements 710 (and thus windows 306) in the Master Application Window List 710 as set forth above, the listing of windows is preferably subject to certain restraints to maintain a coherent display of windows to the user. Specifically, all of the windows are organized as classes, e.g., modal, floating and document window classes, and these classes are each arranged in a separate and contiguous sequence 752, 754 and 756, respectively, within the Master Application Window List 700. For example, data elements 710, corresponding to windows 1 through N in the Master Application Window List 700, are all modal windows. On the other hand, elements 710 corresponding to Windows N+1 through N+M are all floating windows and elements 710 corresponding to windows (N+M)+1 through (N+M)+P are all document windows. Preferably, the classes are distinguishable from the other classes by predetermined transitions within the list 700.

The list 700 is preferably organized in order to maintain a standard window environment convention. That is, the floating windows always appear in front of the document windows and the modal windows always appear in front of the document and floating windows. However, although the application program 302 is free to order the floating windows it has defined in any desired manner, it is not free to place a floating window within the sequence of elements 756 associated with the document window class. The same is true for document windows and modal windows, e.g., the application 302 may arrange the sequence of document windows in any order that it chooses but it may not place a document window in the sequence of elements 710 associated with the modal window class. By imposing this constraint, an application 302 is prevented from defining a document window that appears in front of, rather than behind, a particular dialog box, thereby always ensuring a coherent window environment.

As noted, predetermined transitions, e.g., a set of transitional pointers, identify the boundaries of the window classes within the Master Application Window List 710; in the illustrated embodiment, these pointers are maintained in main memory 114 (FIG. 1). Specifically, there is a pointer 746 that addresses the beginning of the document window sequence 756, e.g., Window (N+M)+1, a pointer 744 that addresses the beginning of the floating window sequence 754, e.g., Window N+1 and a pointer 742 that addresses the beginning of the modal window sequence 752, e.g., Window 1. These transitional pointers 742, 744 and 746 are maintained in order to identify the beginning of each class sequence 752, 754 and 756, respectively, within the Master Application Window List 700 in order to, e.g., insert additional document windows, floating windows or modal windows in that list 700.

In prior systems, selection of a window by an application program typically results in the entire layer of windows associated with that application being simultaneously displayed on the screen 135. Because many document and palette windows are often unrelated to the particular task requested by the user, such an application-specific layering and displaying of windows often manifests as a crowded and inefficient window environment for the user. Nonetheless, since the prior art did not have the capability of creating or displaying groups of windows containing less than the entire layer of windows, users were prevented from customizing their display environments to eliminate these unrelated windows. The prior art window manager also did not allow the application program to iterate, i.e., scan or view, the windows defined by the application. The present invention is directed solving these problems by providing a flexible mechanism for creating, organizing and manipulating windows and window groups for display to the user.

Figure 8:
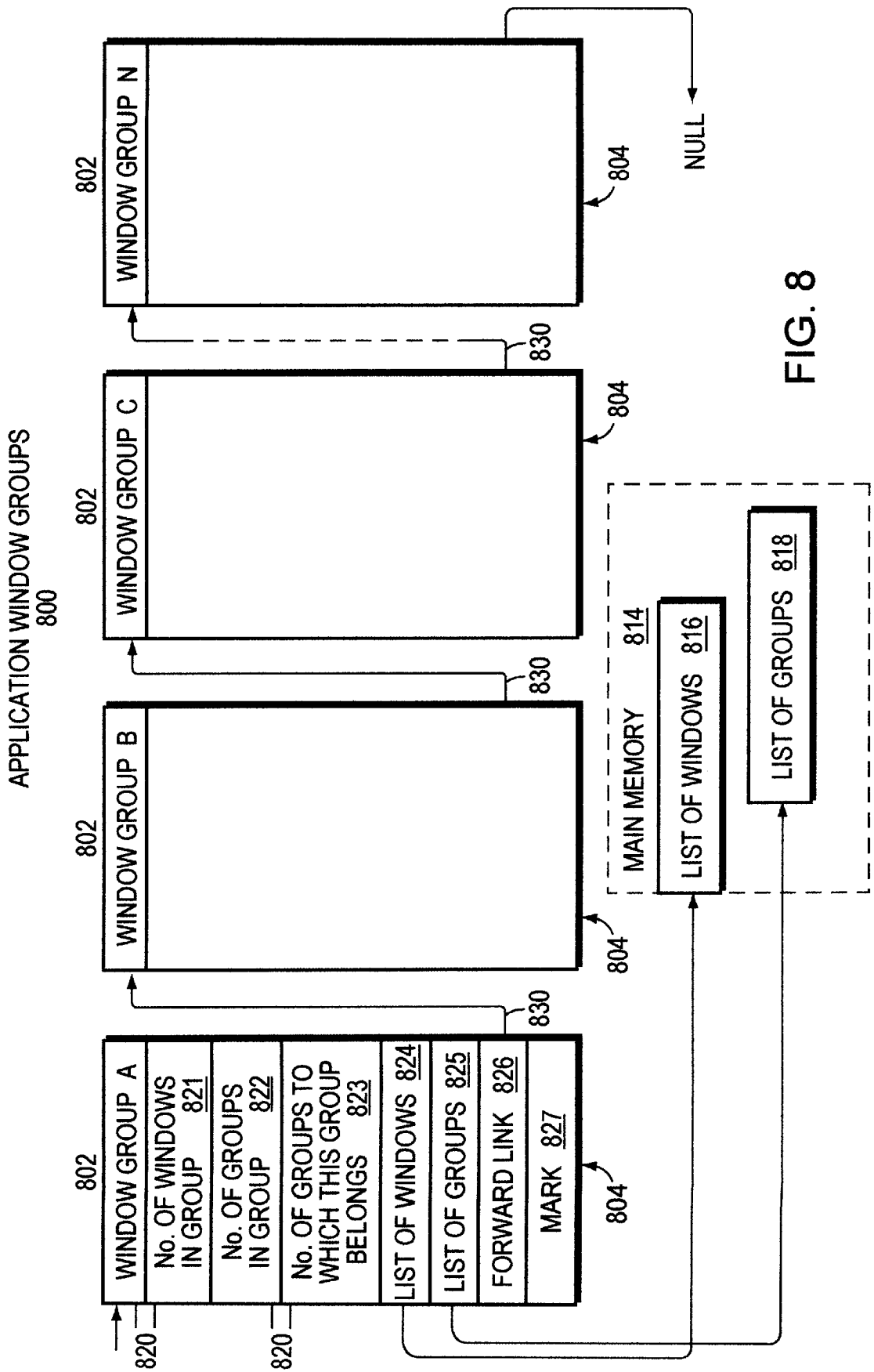
FIG. 8 is an illustration of the related data structures representing the window groups defined by an application program.

FIG. 8 is a highly schematized diagram depicting an illustrative arrangement of data structures 802 in a portion of memory 114 (FIG. 1) that are created and manipulated in response to a set of novel methods (functions). It should be noted that these methods are preferably associated with the window objects 306 constructed by the application program 302. However, in an alternative embodiment, the application programs may issue these functions as task commands (system calls) embedded within the API layer of the computer system.

The data structures 802 are preferably organized in "linking" relation to form a linked data structure which, in the illustrative embodiment, is a singly linked list 800. The structure of the singly linked list 800 facilitates implementation of the methods described in more detail herein. These methods include:

NewWindowGroup ( );
DisposeWindowGroup ( );
AddToGroup ( );
RemoveFromGroup ( );
AddWindowGroupToWindowGroup ( );
RemoveWindowGroupFromWindowGroup ( );
SetAttachedWindowGroup ( );
GetAttachedWindowGroul ( );
SelectWindowWithGroup ( );
Select ( );
GetApplicationWindowGroup ( );
GetWindowClassWindowGroup ( );
GetWindowsInWindowGroupAndLayer ( );
GetWindowsInWindowGroup ( );
GetWindowGroupslnWindowGroup ( ) and;
FrontWindowOfWindowGroup.
Creation of Window Groups To organize a selected set of windows into a window group, the NewWindowGroup method may be invoked. An identifying reference, such as newGroup, is preferably assigned to identify the new window group and is subsequently maintained by the application program 302. In response to invocation of the NewWindowGroup method, a portion of main memory is allocated for the new group in a conventional manner by a memory management facility (not shown) and the data fields within the allocated memory are initialized.

The allocated memory for each new group is preferably integrated within the linked list 800 as an element 802 comprising a table array 804. Each table array 804, moreover, preferably includes a plurality of entries 820 each of which contains at least one field that stores information or data related to the group. For example, the first entry 821 in the table array 804 contains a value representing the number of windows added to the group, whereas the second entry 822 signifies with a value the number of window groups encompassed within the group. Similarly, the third entry 823 contains a value representing the number of window groups in which the group is a member.

The fourth entry 824, in contrast, contains a list of windows 306 added to the group. Rather than repeating the detailed information about each window, the fourth entry 824 preferably contains a list of address pointers (not shown) one for each window currently added to the group. These pointers reference the specific locations in main memory 814 where the corresponding individual elements 710 of the added windows are stored. The fifth entry 825 similarly contains a list of all of the window groups encompassed within the group. That is, the fifth entry 825 contains a list of address pointers (not shown) one for each group encompassed within the group that references the locations in main memory 814 where each corresponding group element 802 is stored.

Because the allocated table array 804 is an element 802 of the singly linked list 800, it contains a reference to the next element of the list 800. Therefore, the sixth entry 826 contains a forward link to the element 802 representing the next window group in the list, e.g., Window Group B, as shown by arrow 830. The seventh entry 827 contains a mark that may be set or unset during scanning of the list as described in more detail below.

When the second and each subsequent window group is created by invoking the NewWindowGroup method, the forward link 826 in the previous window group is set to the address of new group. In this manner, all of the window groups created by an application program 302 are linked together in the list 800. The list, moreover, can be quickly searched to identify the window groups associated with a particular application program. The forward link 826 in the last window group is preferably set to null during initialization.

Once the portion of memory allocated for the new group is initialized as the table array 804, windows can be added to the new group preferably by invoking the AddToGroup method using the group reference and the window reference as its arguments. By invoking AddToGroup, any of the windows from the Master Application Window List 700 (FIG. 7) can be added to the new window group.

When adding a window 306 to a window group, the first entry 821 in the array 804 associated with the group is incremented to reflect the current number of windows contained in the group. A pointer is inserted into the fourth entry 824 of the table 804 specifying the location in main memory 814 where information associated with the added window is stored. Finally, the element 710 (FIG. 7 of the Master Application Window List 700) corresponding to the added window is accessed and the third entry 733 of its array 720 is incremented to indicate its current window membership in the group. It can thus be seen that, following this procedure, a window group can be created comprising any number of individual windows from the list 700, such as the second and third document windows, the first, sixth and seventh floating windows and the fourth, sixth and eleventh modal windows.

To remove a window from a window group, the Remove-FromGroup method is preferably invoked using the window reference and the window group reference as its arguments. By invoking the RemoveFromGroup method, the address pointer of the removed window is deleted from the fourth entry 824 in the table array 804 associated with the selected window group. The first entry 821 in the table array 804 is then decremented to reflect the current number of windows in the group. Finally, the element 710 corresponding to the removed window is accessed in order to decrement the third entry 733 signifying the current number of window groups to which the window belongs.

Rather than adding windows 306 individually to a group, groups can be encompassed within groups by invoking the AddWindowGroupToWindowGroup method which preferably uses the groups references for the two groups as its arguments. For ease of description, we will refer to a base group and a target group such that the target group is added to the base group. By invoking the AddWindowGroupToWindowGroup method, a pointer is added to the fifth entry 825 in the table array 804 of the base group. This pointer references the storage location in main memory 814 containing information associated with the target window group. The value stored in the second entry 822 in the table array 804 of the base group is then incremented indicating that the base group now contains one window group. Thereafter, the element 802 corresponding to the target window group is accessed and the value of the third entry 823 in its table array 804 is incremented to indicate that the target window group is now a member of a window group. Thus, the sixth window group may contain, for example, the first document window, the third and fifth palette windows, the second modal window and the first and second window groups.

The RemoveWindowGroupFromWindowGroup method preferably functions to remove a window group from another window group using, as arguments, the references for the base group and the target group. Here, invocation of the method results in the address pointer for the target window being deleted from the fifth entry 825 in the table 804 corresponding to the base group. In addition, the value of the second entry 822 for the base group is decremented signifying that the base group contains one less window group. Finally, the data element 802 corresponding to the target window group is accessed and the value of the third entry 823 is decremented.

To delete a window group, the DisposeWindowGroup method is employed using the reference for the disposed group as the argument. In response to this method, information contained within the third entry 823 in the table array 804 of the disposed window group is reviewed to determine if the disposed window group is a member of any other window groups. If the value within this entry 823 is greater than zero, then the disposed group has been added to other groups and those groups must be accessed to complete the method. In particular, the pointer contained in the fifth entry 825 of each data element 802 corresponding to those window groups associated with the disposed group is deleted; the value of the second entry 822 is then decremented; and the portion of memory previously allocated for the disposed group is deallocated and returned to the memory management facility.

SelectWindowWithGroup

In addition to creating window groups and adding window groups to groups, the application program 302 can also cause the display screen 235 to be re-drawn with a selected window and window group at the front of the screen 235, by invoking the SelectWindowWithGroup method. This method preferably uses the references for the selected window and window group as its arguments.

In response to invocation of this method, the window element 710 corresponding to the selected window is accessed and the mark in its sixth entry 736 is set. Next, the group element 802 corresponding to the selected group is accessed first to set the mark contained in the seventh entry, signifying that this group has been addressed. After setting the mark, the address pointers listed in fourth entry 824 are scanned to identify each window element 710 corresponding to each window added to the selected group. Each element 710 is then sequentially addressed and the mark contained in its sixth entry 736 is set.

After marking each window added to the selected group, those windows in the groups encompassed within the selected group are identified and marked according to the following procedure. First, the list of address pointers to each window group encompassed in the selected group (i.e., the contents of the fifth field 825) is scanned to identify the constituent group elements 802. For each of these group elements 802, the mark contained in the seventh entry 827 is examined to determine its state. If the mark is unset, it is set to indicate that this group has been scanned. If the mark is already set, the next group in the list is accessed. Marking in accordance with this procedure prevents the window grouping mechanism from accessing a window group more than once. This is particularly important since window groups can be encompassed within other window groups and two groups can be encompassed within each other.

Thereafter, each window identified in the list of windows in the fourth entry 824 of group element 802 is accessed to set the mark contained in its sixth entry 736. Such marking correlates each window element 710 in the Master Application Window List 700 to the selected window and a window either added to the selected group or added to a group encompassed within the selected group.

The Master Application Window List 700 is then scanned using the forward links 735 in each window element 710 to identify all "marked" windows (i.e., window elements 710 containing set marks in their sixth entry 736). The marked windows are then moved from their current locations in the Master Window Application List 700 to the front of their respective class sequences 752, 754, 756. During this "re-ordering" exercise, the marked windows are re-drawn to the front of the display screen 235. The Master Application Window List 700 is then scanned using the forward links in the fifth entries 735 of the window elements 710 and the marks in the sixth entries 736 are reset. Similarly, the list of window groups 800 is scanned using the forward links of the group elements 802 and the marks in the seventh entries 827 of the window elements 802 are reset; as a result, the Master Application Window List 700 and the list of window groups 800 are ready for the next operation.

In addition to supporting the creation and selection of windows and window groups, the novel window grouping mechanism further allows a group to be attached to an individual window for display purposes. Selection of the attaching window results in that window and all of the windows in the attached group (together with all windows in the groups encompassed in the attached group) being pulled to the front of the display screen 235 (FIG. 2). In this manner, users can create window groups consisting of various subsets of the windows defined by a particular application and, in response to selection of a single window, efficiently cause only those selected windows (i.e., those windows placed in the attached window group) to be displayed at the front of the display screen.

To attach a particular window group to a window 306, the SetAttachedWindowGroup method is utilized having the window reference for the attaching window and the group reference for the attached group as arguments. Here, the array 720 corresponding to the attaching window is accessed so that the main memory address for the group element 802 corresponding to the group being attached may be inserted in its fourth entry 734.

As discussed above, selection of an attaching window, e.g., "clicking" of the attaching window using a pointing device, such as the mouse 130 (FIG. 1), results in that window and all the windows in the group attached thereto being drawn to the front of the display screen 235. This is preferably accomplished by invoking the Select method using the attaching window reference as its argument.

Specifically, this method sets the mark 736 of the element 710 in the Master Application Window List 700 corresponding to the attaching window. The address of the attached group is obtained by scanning information in the fourth entry 734 of the element 710. Using this group address, the element 802 corresponding to the attached group may be accessed to set the mark in the seventh entry 827. Again, if the mark in the seventh entry 827 is already set, then this group has been scanned and it can be skipped. If the group has not been accessed, the fourth entry 824 is read out to obtain a list of the address pointers to each window 306 in the attached group. Each element 710 corresponding to these windows is then individually accessed and the mark contained in the sixth entry 736 of each element is set.

Thereafter, the windows in the groups encompassed within the attached group are identified and marked as follows. Address pointers to the window groups encompassed in the attached group are obtained from the fifth field 825 of the attached window group. Using these pointers, each element 802 associated with these groups is sequentially accessed first to determine if the mark contained in the seventh entry 827 is set. If so, the element 802 has been accessed as discussed above and if not, the mark is set. Then, the list of windows contained in the fourth entry 824 within each element 802 is accessed and the mark 736 in the array 720 associated with each of the windows added to these groups is set.

The Master Application Window List 700 is then scanned to uncover any marked windows (as described above) and those marked windows are preferably moved from their current locations in the Master Window Application List 700 to the front of their respective class sequences 752, 754 and 756. For example, if the second, fifth and eleventh modal windows are marked, these windows now become the first, second and third windows in the modal window sequence 752 of the list 700.

As these windows are repositioned within the list 700 they are simultaneously re-drawn to the front of the display screen 235. If no group was attached to the selected window, then only the mark 736 for the selected window will have been set and, thus, only that window will be displayed. After re-ordering and displaying the marked windows in the Master Window Application List 700, the list 700 is scanned one last time to reset all of the marks in the sixth entries 736 of the window elements 710. Similarly, all marks in the seventh entry 827 of the group elements 802 are reset. The window elements 710 in the Master Window Application List are preferably left in their re-ordered positions.

The window grouping mechanism of the present invention also allows an application program 302 to iterate, i.e., scan or view, all of the windows defined by that application 302 as well as all of the windows added to a group and added to a group encompassed within that group. In accordance with the invention, the application program 302 can thus review the ordering of windows in the Master Application Window List 700 as well as the ordering of windows in the groups.

In the preferred embodiment, the application program 302 may not access either the Master Application Window List 700 or the window group elements 802. Instead, information contained within those linked lists 700, 800 are copied to a contiguous block of buffer memory (not shown) that is accessible by the application program 302. The application program can then "read" that block to determine which windows have been added to a particular group and their order within the group. Thereafter, the application program 302 can re-order the windows in the Master Application Window List 700 or in the groups by removing the window from the list or group and inserting it back into the list or into the group at a selected location.

GetApplicationWindowGroup

In order to iterate the Master Application Window List 700, the GetApplicationWindowGroup method is preferably executed to, first, allocate a contiguous portion of buffer memory in a conventional manner. The Master Application Window List 700 is then scanned front to back using the forward links 730 of each element 710. During this scanning process, information contained in entries 731 (window class) and 732 (window content) are copied to the buffer memory. The remaining information in each window element 710 is preferably retained as "private" and thus not copied for iteration by the application program 302. An address header or pointer assigned by the memory management facility (upon allocation of the buffer memory) is passed to the application program 302 so that it can locate the buffer memory and iterate its contents.

GetWindowClassWindowGroup

To iterate only those windows in the Master Application Window List 700 that belong to a particular window class (e.g., document, modal or floating window classes), the GetWindowClassWindowGroup method is used with the selected window class as its argument. Here, a contiguous portion of buffer memory is allocated and the Master Application Window List 700 is scanned using the transitional pointers 742, 744 or 746. As each table 720 is scanned, information contained in entries 731 (window class) and 732 (window content) are copied to the buffer memory. Again, the remaining information in each window element 710 are preferably retained as private and thus not copied for iteration by the application program 302. An address header or pointer assigned by the memory management facility upon allocation of the buffer memory is similarly passed on to the application program 302 so that the application program 302 can locate the buffer memory and iterate its contents. Unlike the prior art, the application program 302 is thus able to review the windows within a particular window class defined by that program 302.

GetWindowsInWindowGroup

To review the windows in a particular window group, the GetWindowsInWindowGroup method is preferably invoked using the reference for the selected window group as the argument. In response, the element 802 corresponding to the selected group is accessed in order to examine the data field of the fourth entry 824 which provides a list of the windows that have been added to the selected group. More specifically, the entry 824 provides a list of address pointers to the window elements 710 in the Master Application Window List 700. These address pointers are used to access each window element 710 in list 700 and set the mark contained in the sixth entry 736.

Upon marking each of the windows listed in entry 824, the contents of the fifth entry 825 are read to retrieve a list of window groups encompassed in the selected group. Each of these groups is accessed in sequence as described above and the mark contained in the seventh entry 827 is checked. If this latter mark is not set, it is set and, if the mark is already set, then the group corresponding to that group element 802 is skipped. For those groups that have not previously been accessed, the sixth entry of window element 710 corresponding to each window added to these groups is marked. Once all of the windows of list 700 that are added to the selected group or added to a group encompassed in the selected group have been marked, the list is scanned and information is copied from the first entry 731 [window class] and the second entry 732 [window content] to the buffer memory. After completing the second pass through the Master Application Window List 700, the list is scanned again to reset each mark.

The application program 302 then iterates through the copied information to review the window members of the selected group and their particular order within that group. By invoking the AddToGroup and RemoveFromGroup methods, the contents of the selected window group can be manipulated.

GetWindowsInWindowGroupAndLayer

Another novel method of the invention allows the application program 302 to examine those windows of a selected group which are in a particular window class (e.g., modal, floating or document window classes). This permutation is preferably implemented using the GetWindowsInWindowGroupAndLayer method with the selected group reference and the selected layer used as arguments. Each of the windows added to the selected group or added to a group encompassed in the selected group is marked in the Master Application Window List 700 as described above. Rather than scanning the entire list 700, however, only the sequence corresponding to the selected class is scanned (e.g., modal window sequence 752, floating window sequence 754 or document window sequence 756) using the appropriate transition pointers 742, 744, 746. Information in the first entry 731 [window class] and the second entry 732 [window content] of the marked windows in the scanned sequence are then copied to the buffer memory for access by the application program 302. The list sequence 752, 754, 756 is scanned once more to reset each of the marks in the sixth entry 736 of the elements 710.

GetWindowGroupsInWindowGroup

To view the window groups in a particular group, the method GetWindowGroupsInWindowGroup is preferably invoked using the group reference as an argument. Here, the second entry 822 of each data element 802 corresponding to the selected group is accessed to determine whether any groups are currently encompassed in the selected group. If the selected group encompasses other groups, the list of groups contained in entry 825 is copied into a portion of buffer memory accessible by the application program 302. The application program 302 can then review this list of group references to determine which groups are encompassed in the selected group. By employing the AddWindowGroupToWindowGroup and RemoveWindowGroup-FromWindowGroup methods, the application program 302 can alter the contents of the selected group.

GetAttachedWindowGroup

To determine whether a group is attached to a particular window, the GetAttachedWindowGroup method is preferably invoked using the window reference as an argument. By invoking this method, the fourth entry 734 in the table 720 corresponding to the selected window is reviewed to determine whether a group is attached to the window. If a group is attached to the window 306, the reference for that group is copied to a portion of buffer memory for review by the application program 302.

FrontWindowOfWindowGroup

In addition to iterating the windows in a window group, the window grouping mechanism of the present invention allows the application program 302 to determine the first window in a window group by invoking the FrontWindowOfWindowGroup method using the group reference as the argument. In response to this method, all of the windows added to the group and all of the windows added to the groups encompassed in the group are marked as described in reference to the GetWindowsInWindowGroup method. However, when the list 700 is then scanned for marked elements 710, only information in the first entry 731 and second entry 732 of the first marked window are copied into the buffer memory for access by the application program 302.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. In a computer system including a display screen and at least one application program for defining a respective set of application-specific windows that correspond to the application program and which may be displayed on the display screen, a window manager comprising:

a window grouping mechanism interactively coupled to the application program for efficiently organizing the set of application-specific windows into window groups for selective display on the display screen, the window grouping mechanism comprising:

A. means for organizing the set of predefined application-specific windows for the at least one application program into a plurality of window groups such that each window group may contain a different subset of the respective application-specific windows;

B. means for allowing a window group of the at least one application program to encompass one or more other window groups of the at least one application programs; and C. means for selecting, in response to opening the application program, one of the window groups so that the application program is represented on the display screen by the corresponding subset of the respective application-specific windows within the selected window group.

2. The window manager of claim 1 wherein the organizing means includes a window data structure representing the application-specific windows.

3. The window manager of claim 2 wherein the window data structure is a list of data elements and each data element is a table array having a plurality of entries, each entry containing a field for storing data.

4. The window manager of claim 3 wherein the data elements form a linked list.

5. The window manager of claim 4 wherein the entries of each data element associated with a particular application-specific window include information regarding the number of window groups to which the window belongs, a forward link to the next element in the list and a mark.

6. The window manager of claim 5 wherein the allowing means includes a window group data structure representing the window groups defined by the application program, the window group data structure comprising a linked list of data elements having a plurality of entries, each entry containing a field for storing data.

7. The window manager of claim 6 wherein the entries of each element associated with a particular window group include information regarding the number of windows in the group, the groups encompassed in the group, the number of groups to which this group belongs, the window groups encompassed in the group, a forward link to the next element in the list and a mark that may be set or unset.

8. The window manager of claim 7 wherein the window data structure and the window group data structure are manipulated by the application program interacting with the window manager using predefined functions to create window groups, add application-specific windows to window groups and encompass window groups within other window groups.

9. The window manager of claim 8 wherein each application-specific window defined by the application program is associated with a class type and the data elements of the linked list representing the application-specific windows are arranged in sequence according to class type.

10. The window manager of claim 9 wherein the class types include modal, floating and document window classes.

11. The window manager of claim 10 wherein each window group may contain a different subset of document, floating and/or modal class types.

12. The window manager of claim 11 further comprising means for iterating the application-specific windows and window groups.

13. In a computer system including a display screen and at least one application program for defining a respective set of application-specific windows that correspond to the application program and which may be displayed on the display screen, a method for organizing the application-specific windows into window groups for display on the screen, the method comprising the steps of:

generating a window data structure for the at least one application program that is a list of window data elements that correspond to the respective application-specific windows, each window data element being a table array and having a plurality of entries for storing information;

generating a window group data structure for the at least one application program that is a linked list of group data elements that correspond to the window groups, each group data element having a plurality of group entries for storing information;

loading, in response to instructions from the at least one application program, one or more entries of a given window data element for the at least one application program with information identifying the window group to which the window, that is associated with the given window data element, belongs;

loading, in response to instructions from the at least one application program, one or more entries of a given group data element, corresponding to a given window group for the at least one application program, with information identifying the other window groups encompassed within the given window group;

selecting, in response to opening the application program, one of the window groups for the at least one application program; and in response to the step of selecting, displaying the subset of application-specific windows for the at least one application program within the selected window group on the screen.

14. The method of claim 13 wherein the application-specific windows defined by the application program include modal, floating and/or document windows.

15. The method of claim 14 wherein each window group may contain a different subset of modal, floating and/or document windows.

16. The method of claim 13 wherein the computer system further includes a window manager coupled to the application program and the step of generating the window data structure includes issuing a first application programming interface (API) call from the application program to the window manager.

17. The method of claim 16 wherein the step of loading the one or more entries of the given window data element includes issuing a second API call from the application program to the window manager.

18. The method of claim 17 wherein the step of loading the one or more entries of the given group data element includes issuing a third API call from the application program to the window manager.

19. The method of claim 18 wherein the step of selecting includes issuing a fourth API call from the application program to the window manager.

20. The method of claim 19 wherein the first API call is NewWindowGroup, the second API call is AddToGroup, the third API call is AddWindowGroupToWindowGroup and the fourth API call is SelectWindowWithGroup.

21. In a computer system including a display screen and at least one application program for defining a respective set of application-specific windows that correspond to the application program and which may be displayed on the display screen, a computer readable medium containing executable program instructions for organizing the application-specific windows into window groups for display on the screen, the executable program instructions comprising program instructions for:

generating a window data structure for the at least one application program that is a list of window data elements that correspond to the respective application-specific windows, each window data element being a table array and having a plurality of entries for storing information;

generating a window group data structure for the at least one application program that is a linked list of group data elements that correspond to the window groups, each group data element having a plurality of group entries for storing information;

loading, in response to instructions from the at least one application program, one or more entries of a given window data element for the at least one application program with information identifying the window group to which the window, that is associated with the given window data element, belongs;

loading, in response to instructions from the at least one application program, one or more entries of a given group data element, corresponding to a given window group for the at least one application program, with information identifying the other window groups encompassed within the given window group;

selecting, in response to opening the application program, one of the window groups for the at least one application program; and in response to the step of selecting, displaying the subset of application-specific windows for the at least one application program within the selected window group on the screen.

22. The method of claim 21 wherein the application-specific windows defined by the application program include modal, floating and/or document windows.

23. The method of claim 22 wherein each window group may contain a different subset of modal, floating and/or document windows.

24. The method of claim 21 wherein the computer system further includes a window manager coupled to the application program and the step of generating the window data structure includes issuing a first API call from the application program to the window manager.

25. The method of claim 24 wherein the step of loading the one or more entries of the given window data element includes issuing a second API call from the application program to the window manager.

26. The method of claim 25 wherein the step of loading the one or more entries of the given group data element includes issuing a third API call from the application program to the window manager.

27. The method of claim 26 wherein the step of selecting includes issuing a fourth API call from the application program to the window manager.

28. The method of claim 27 wherein the first API call is NewWindowGroup, the second API call is AddToGroup, the third API call is AddWindowGroupToWindowGroup and the fourth API call is SelectWindowWithGroup.

* * * * *